Patented July 3, 1934

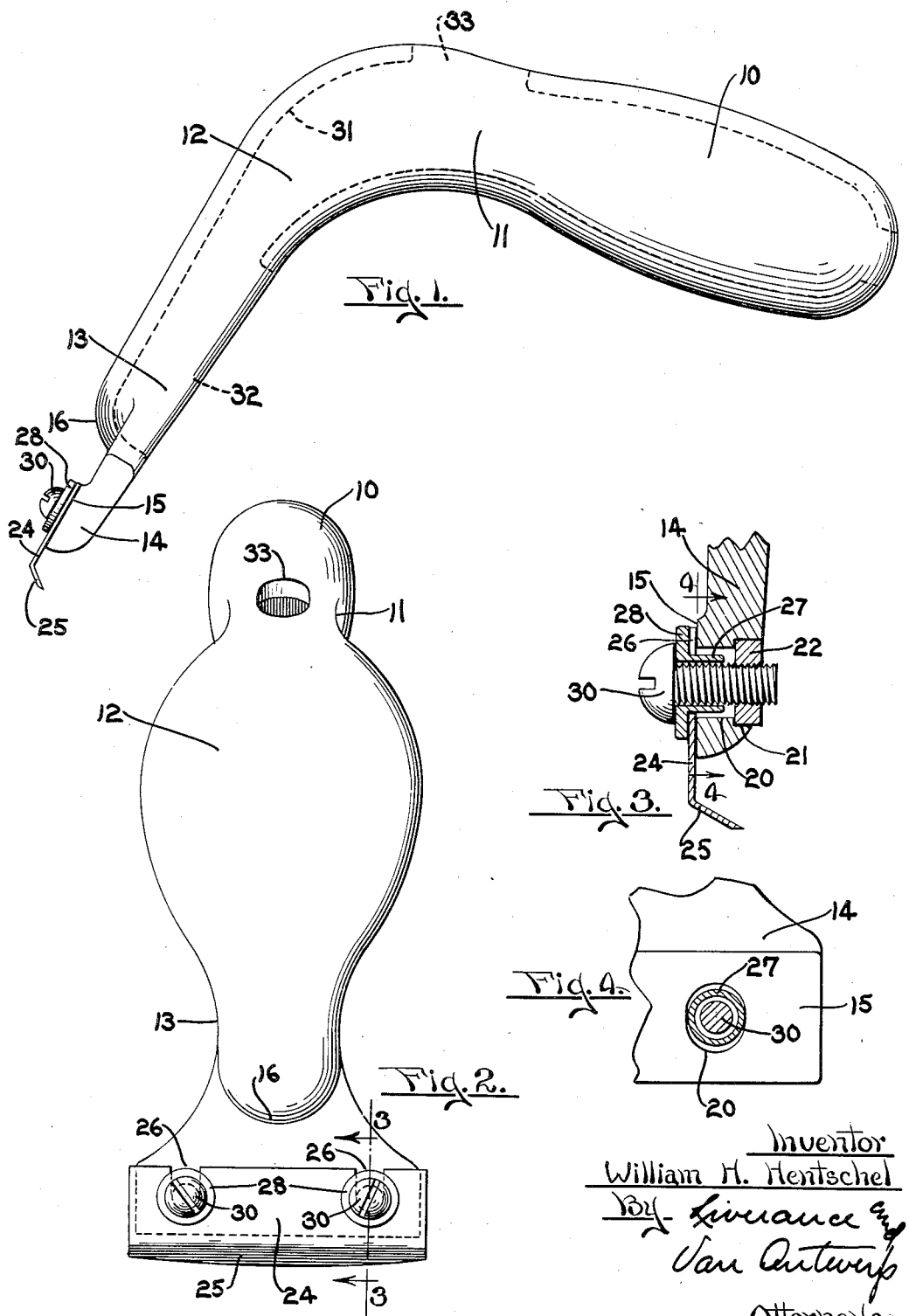

1,964,947

UNITED STATES PATENT OFFICE 1,964,947

HAND SCRAPER

William H. Hentschel, Muskegon Heights, Mich., assignor to Clarke Sanding Machine Company, Muskegon, Mich., a corporation of Michigan Application November 13, 1933, Serial No. 697,802

3 Claims. (Cl. 145—47)

This invention relates to a woodworking tool and more particularly to a hand scraper.

One of the primary advantages of my invention resides in its general shape, the scraper being adapted for either right hand or left hand use. For right hand use, the right hand encircles the terminating portion of the handle and the left hand is located adjacent the scraping blade. The left hand adjacent the thumb encircles the bulged or enlarged portion and the lower part of the left hand extends downwardly against a ledge or shoulder and thus the left hand is maintained against movement upwardly along the handle. Preferably the little finger of the left hand encircles underneath the handle and rests in a recess as will be later described. Also, the thumb of the right hand may reside in a second recess as will be referred to later.

Another advantage of my device resides in the particular connection between the scraping blade and the handle member. The scraping blade is slotted and two spaced apart sleeves extend into these slots and then into the recesses formed through the handle member. These sleeves not only protect the threads of the bolts which pass therethrough but are also flanged in order to provide proper bearing surfaces against the scraping blade. The other ends of the openings through the handle member are enlarged and circular nuts are press fitted therein, such construction being advantageous for two reasons. In the first place, the nuts are flush with the outer face of the body member and in the second place the holes for the nuts are of circular shape whereby they are easily formed.

Other advantages will become apparent as the description proceeds.

In the drawing:—

Fig. 1 is a side view of my improved hand scraper.

Fig. 2 is an end view thereof.

Fig. 3 is a view in cross section, this view being taken along the line 3—3 of Fig. 2.

Fig. 4 is a fragmentary view taken along the line 4—4 of Fig. 3.

Similar numerals refer to similar parts throughout the several views.

Referring particularly to Figs. 1 and 2, numeral 10 indicates a cylindrical handle portion which extends upwardly to form a slightly narrowed portion 11 and is then continued in an enlarged section 12 located substantially at right angles thereto.

The enlarged section 12 continues to form a relatively narrow neck portion 13 and then terminates in an edge 14 which may be machined as indicated at 15. A shoulder or ledge 16, see Fig. 1, is located between the neck 13 and the terminating edge 14.

The terminating edge 14 is formed with two spaced openings 20 therethrough, these openings being enlarged as indicated at 21 to receive the circular nuts 22. The nuts 22 are press fitted into the enlarged portion 21 as clearly shown in Fig. 3.

A cutting blade 24, having a curved cutting edge 25, is formed with slots 26. These slots receive the sleeve portions 27 therethrough and flanges 28, integral with said sleeve portions, bear against the outer face of the plate as clearly shown in Figs. 1, 2 and 3. The sleeve portions 27, see Fig. 4, extend through the openings 20 and have a slight amount of play therein. Bolts 30 extend through the sleeves 27 and thread into the nuts 22 whereby tightening thereof securely hold the scraping blade in position.

The handle structure, previously referred to, is cored or hollowed out as indicated at 31 and opens through the handle member at 32 and at 33 to form recesses therein. The recess 32 is adapted to receive the little finger and provide a resting place therefor while the opening 33 may be utilized as a rest for the thumb on the other hand.

Having thus revealed this invention, I claim as new and desire to secure the following combinations and elements, or equivalents thereof, by Letters Patent of the United States.

I claim:

1. A hand scraper of the class described comprising, a body member having a cylindrical portion adapted to be grasped by the hand of the user, a second portion of substantially rectangular cross section integrally formed with and extending substantially at right angles to the first mentioned portion, said second mentioned portion having a flat top surface for the purpose described, said second portion merging into a neck portion and terminating in an edge of substantially the same width as the second mentioned portion, and scraping means fastened at the said edge.

2. A hand scraper as set forth in claim 1 but also having a shoulder located on the top of said neck for the purpose described.

3. A scraper of the class described comprising a body member having a terminating edge, holes through said body member a short distance from said edge, said holes being enlarged to form shoulders therein, nuts abutting against said shoulders, a cutting blade having slots in alinement with said holes, flanged sleeve means extending through the slots and bearing against the upper side of the blade and screws extending through each of said flanged sleeve means and into said nuts for the purpose described.

WILLIAM H. HENTSCHEL.